Feb. 4, 1958          H. F. BREMER          2,822,112
APPARATUS FOR DISPENSING HEATED BEVERAGE OR WATER
Filed March 13, 1953          4 Sheets-Sheet 4
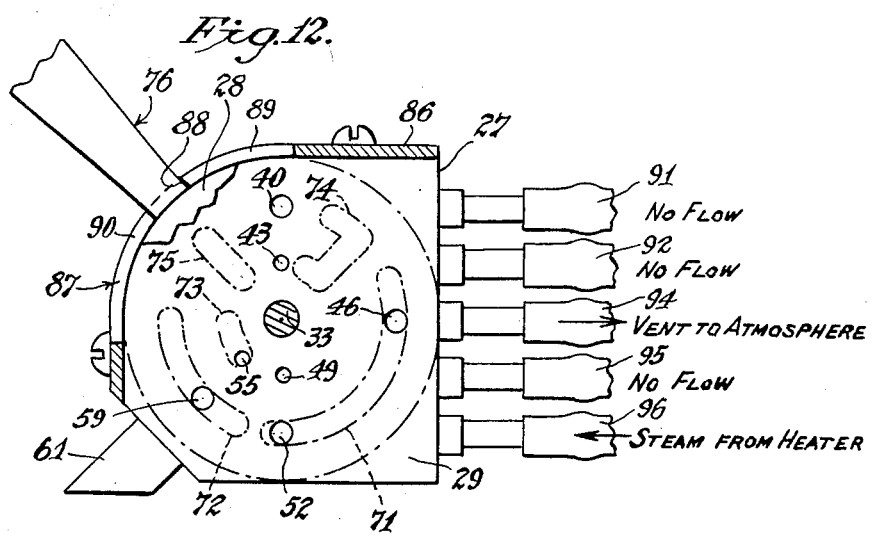
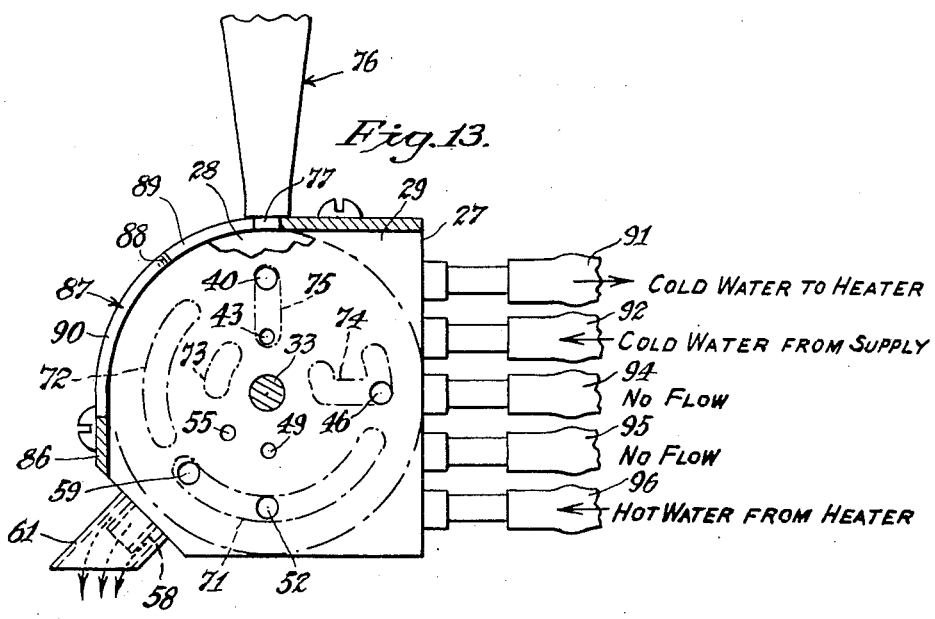
INVENTOR
HERMANN F. BREMER
BY
Kenyon & Kenyon
ATTORNEYS United States Patent Office 2,822,112
Patented Feb. 4, 1958

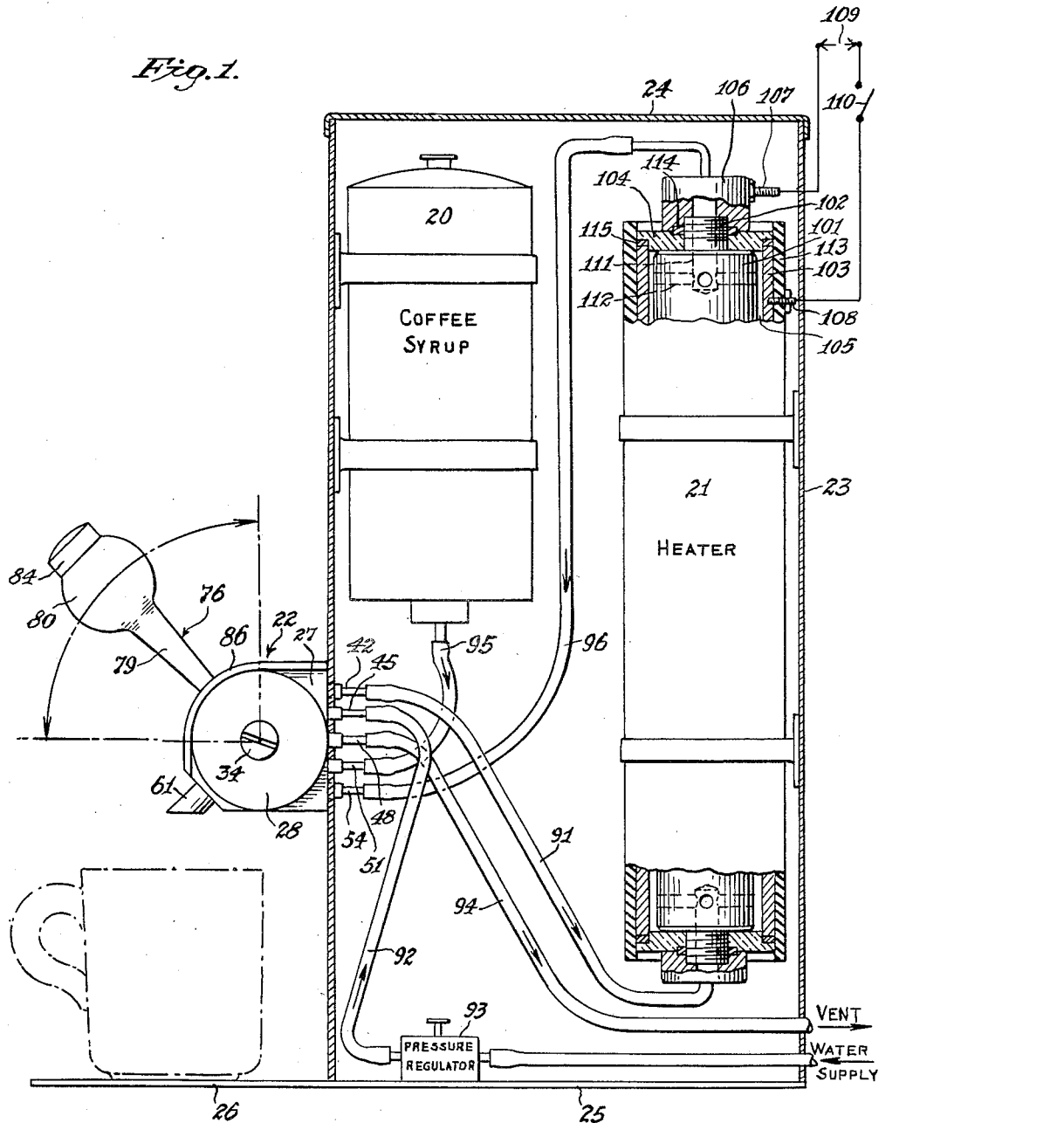

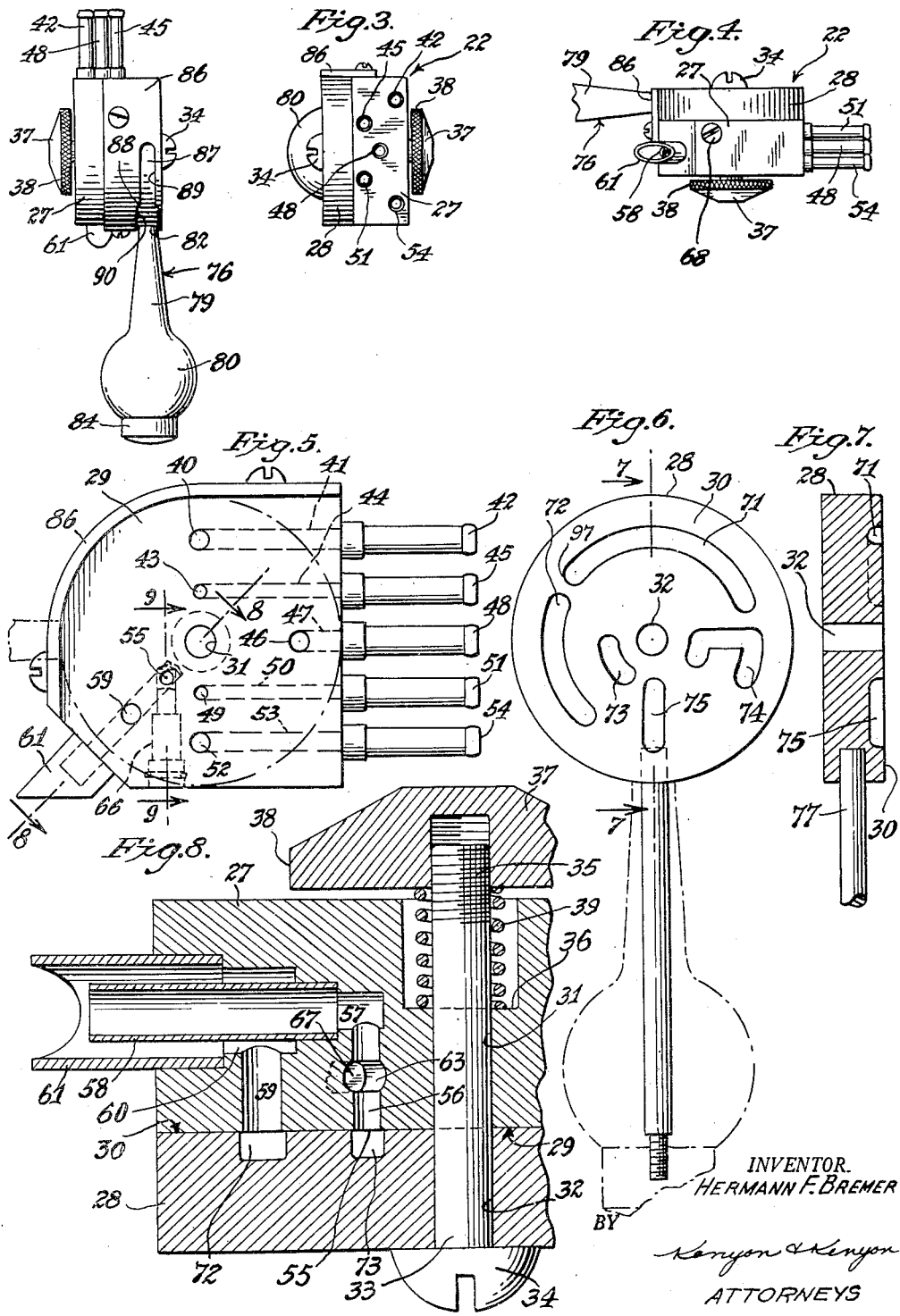

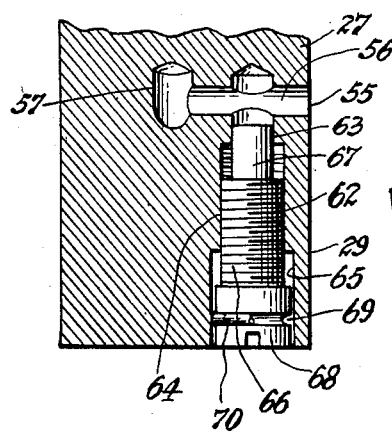
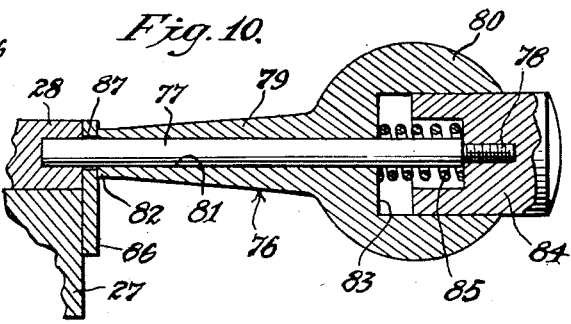
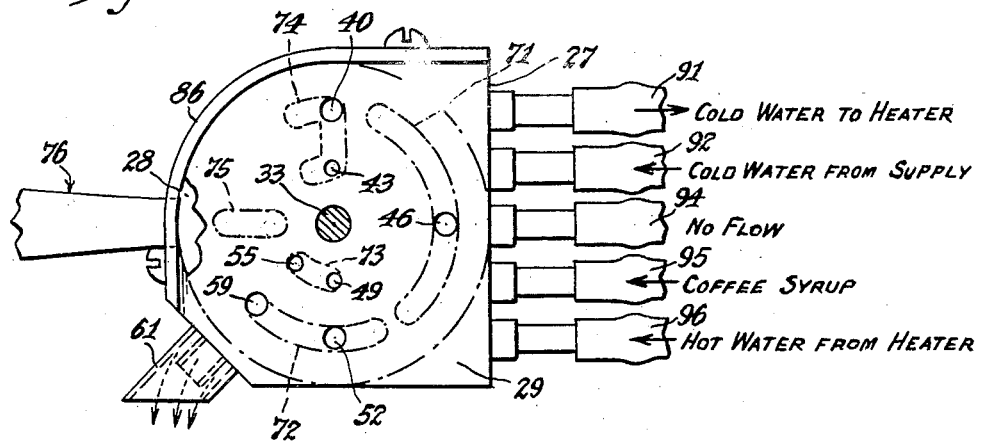
POSITION FOR DRAWING A CUP OF COFFEE

2,822,112

APPARATUS FOR DISPENSING HEATED BEVERAGE OR WATER

Hermann F. Bremer, Bronx, N. Y., assignor, by mesne assignments, to Carbon Heater Corporation, New York, N. Y., a corporation of New York Application March 13, 1953, Serial No. 342,165

8 Claims. (Cl. 222—129.1)

This invention relates to an apparatus for dispensing heated beverage or water or both, and is here disclosed in its application to a coffee dispenser.

Among the objects of the invention are to eliminate the conventional coffee urn in which coffee is stored after percolation of water through grounds. Another object is to eliminate all mechanical switching elements in the heating current circuit, the water itself serving as the contact member and opening the circuit when it boils away. Another object is to provide means whereby a dispensing valve simultaneously admits cold water to the heater and discharges hot water into the cup, in approximately equal amounts, and when these flows are simultaneously shut off, vents the heater to atmosphere so that residual water in the heater boils away, thereby terminating electric current flow between electrodes in the heater without creation of dangerous steam pressure. Another object is to provide a discharge valve for a beverage dispenser in which the flavoring syrup and hot water are not physically mixed until they emerge at the spout, the passageway for syrup containing an adjustable valve by which the rate of flow of syrup, and hence the "strength" of the coffee or other beverage, may be adjusted.

Referring to the annexed drawings which form part of this apparatus

Fig. 1 is a vertical section through a coffee-dispensing machine according to this invention, showing the principal elements and the interconnecting lines of tube;

Fig. 2 is a top plan view of the dispenser after removal thereof from the machine;

Fig. 3 is a rear elevation view of the dispenser;

Fig. 4 is a bottom plan view of the dispenser;

Fig. 5 is a vertical elevation of that portion of the dispenser which constitutes the fixed valve member 27;

Fig. 6 is a vertical elevation of the movable valve member 28;

Fig. 7 is a vertical section on the line 7—7 of Fig. 6;

Fig. 8 is a partial section on the line 8—8 of Fig. 5. For convenience there is also shown in this figure, on the same sectional plane, the movable valve member 28 and the pivot pin 33 and nut 37 which hold the two valve members 27, 28 in fluid-tight engagement;

Fig. 9 is a partial section on the line 9—9 of Fig. 5;

Fig. 10 is a section through the operating handle 76, showing its attachment to the movable valve member 28;

Figs. 11, 12 and 13 are similar to Fig. 5 and, in addition, show in dotted outline the movable valve member in three different positions and by applied legends here incorporated by reference, describe the function at each position and the flow of fluids by reason of the interconnections formed between the two valve members, the water supply line, the heater, the syrup tank, the vent to atmosphere, etc.

Referring to the drawings and particularly Fig. 1, the device as a whole includes a tank 20 for flavoring concentrate, such as coffee syrup; a water heater generally designated 21, which is preferably of the flash-boiler type heated by electricity as hereinafter described; and a delivery mechanism or "spigot" generally designated 22, described below, by means of which hot beverage or hot water may be drawn into a container such as a cup. Tank 20 and heater 21 are preferably mounted within a casing 23 having a removable cover 24. The spigot 22 is secured externally of the casing 23, with its nipples projecting into the interior of the casing. A series of lines of tubing within the casing provide interconnection between the tank, the heater and the spigot, and between these and a source of water and a vent to atmosphere, as described below. Casing 23 is preferably mounted upon a base 25 having a cup rest 26 projecting forwardly beneath the delivery mechanism 22 and at a suitable distance below the spout thereof.

The water heater 21 consists essentially of two oppositely-poled electrodes between which the water flows and is heated by conduction.

Heater 21 may, for example, comprise two oppositely-poled electrodes, one a drum-shaped primary electrode 101 of conducting material having a projecting coaxial hub-like portion 102 integral with each end thereof, and the other a sleeve-like secondary electrode 103 of conducting material mounted coaxially with the primary electrode 101 by means of a porcelain mounting disc 104 engaged upon hub-like portion 102 and engaging with the ends of secondary electrode 103. The external diameter of primary electrode 101 is somewhat less than the internal diameter of secondary electrode 103, thus leaving an annular space 105 between them which serves as a passageway for flow of water to be heated. Conducting cap 106, screw-threadedly engaged upon hub-like portion 102, affords a means of attaching water line 96 to the heater and also carries terminal post 107 through which the primary electrode is electrically energized. Another terminal post 108 mounted upon secondary electrode 103 provides the means by which the secondary electrode may be electrically energized. Posts 107 and 108 are connected across a source of current 109 through switch 110. When switch 110 is closed, primary electrode 101 and secondary electrode 103 are oppositely poled in accordance with the applied voltage, which may be ordinary alternating line current at 110 volts. Drillings 111 and 112 provide a pathway for water through hub-like portion 102 and primary electrode 101, thus affording a conduit for the flow of water between space 105 and line 96. A tubular enclosing shell 113, preferably of insulating material, protects the outer surface of secondary electrodes 103 and maintains the entire assembly in proper relation. Packing material 114, 115 is provided to afford water-tight integrity.

The primary and secondary electrodes 101 and 103 may be unitary and of length and annular spacing from each other suited to the hardness (i. e., electrical conductivity) of the water and contemplated rate of flow, or one or the other of these electrodes may be subdivided into sections insulated from each other, the secondary electrode having segments of different internal surface area or different length, or the primary electrode having segments of different internal diameter or different external surface area, as disclosed in application Serial No. 281,944, filed April 12, 1952 by Hermann F. Bremer and Joseph A. Gondolfo, which said arrangement permits adjustability to water supplies of differing degrees of hardness. The present invention is not, however, limited to the particular form of heater claimed in said application Serial No. 281,944, although that form is preferred, but may use a heater of any desired construction wherein water is heated by passing between a pair of oppositely-poled electrodes shaped to permit water flowing between them to be heated conductively by current passing between the electrodes.

Spigot 22 comprises two major parts, a stationary valve member or bed plate 27 and a movable valve member or movable plate 28.

A hole 31 (see Fig. 8) drilled centrally through valve member 27 and a hole 32 drilled centrally through valve member 28, permit these two valve members to be mounted with their respective flat smooth working surfaces 29, 30 in contact during rotative movement around the axis of a pivot pin 33 passing through holes 31 and 32. Pivot pin 33 is provided with a head 34 and a reduced shank portion 35. Hole 31 in valve member 27 is formed with one portion thereof enlarged to define a shoulder 36. Nut 37, having a knurled edge 38 for convenient manipulation, is internally screw-threaded for engagement with shank portion 35 of pin 33, and a coiled spring 39 interposed between shoulder 36 and the face of nut 37 permits convenient adjustment of the degree of friction between the working surfaces 29 and 30 of valve members 27 and 28.

In the working surface 29 (see Fig. 5) of valve member 27 are drilled a series of holes which, unlike hole 31, do not extend through the block. These holes, about to be described in this paragraph, are drilled at right angles to smooth surface 29 and are herein referred to as "ports" because of their cooperation with matching grooves formed in the smooth surface 30 of movable valve member 28, to be described hereafter. Each of the holes mentioned in this paragraph intersects, within the body of the block, a hole drilled at right angles thereto and leading in a direction beneath and parallel to the smooth surface 29. Thus (see Fig. 5), port 40 communicates with drilling 41 leading to nipple 42; port 43 communicates with drilling 44 leading to nipple 45; port 46 communicates with drilling 47 leading to nipple 48; port 49 communicates with drilling 50 leading to nipple 51; port 52 communicates with drilling 53 leading to nipple 54; port 55, at the upper end of hole 56 (see Fig. 8), communicates with drilling 57 which communicates with inner spout tube 58. Port 59 communicates with drilling 60 which communicates with outer spout tube 61.

Within stationary valve member 27 is located a drilling 62 (see Fig. 9) whose axis is parallel to surface 29 and intersects at right angles the axis of hole 56, preferably above the point where said hole communicates with drilling 57. Drilling 62 consists of three parts of different diameter, an inner part 63 of smallest diameter, an outer part 65 of largest diameter, and an intermediate part 64 of intermediate diameter which is screw-threaded. Into drilling 62 there is fitted a screw-threaded bolt 66 having at one end a reduced shank portion 67 adapted to fit within inner part 63 of the drilling 62, having an intermediate screw-threaded portion adapted to engage with the screw threads of intermediate part 64 of drilling 62, and a head 68 slotted at its outer end and having a circumferential groove 69 in which a circular washer 70 of rubber or other equivalent material is adapted to be seated. Washer 70, when seated in groove 69, is adapted to make fluid-tight engagement with the walls of the outer part 65 of drilling 62. As bolt 66 is advanced and retracted within drilling 62 (by means of a screw driver) the reduced shank portion 67 thereof is advanced and retracted across the axis of hole 56 and thereby varies the effective orifice in order to vary the rate of flow of liquid, in this instance coffee syrup adapted to flow in hole 56 under the conditions hereinafter described.

Movable valve member 28 is preferably formed of a disc of brass or other corrosion-resistant material. In the smooth surface 30 thereof (see Figs. 6 and 7) are drilled a series of grooves 71, 72, 73, 74 and 75. These grooves are of suitable depth and configuration to afford an adequate connecting channel between the ports with which they engage (as shown in Figs. 11, 12 and 13). Grooves 71 and 72 serve as the hot water and steam passageways, groove 73 serves as the coffee syrup passageway, and grooves 74 and 75 serve as the cold water passageways. These grooves are adapted, when the movable valve member 28 is rotated about the axis of pin 33, to register with certain of the above-mentioned ports, and to bring them into fluid communication. Thus, grooves 71 and 72 (see Fig. 11) register with two or more ports 46, 52 and 59; groove 73 registers with one or more ports 49 and 55; and grooves 74 and 75 register at certain times with both of ports 40 and 43.

Movable valve member 28 is actuated from one to another of its several control positions by means of a handle designated generally as 76. Handle 76 (see Fig. 10) comprises a rod 77 secured to valve member 28 and having a reduced end portion 78 which is screw-threaded, a finger-grip member 79 having a bulbous outer end portion 80 containing a longitudinal drilling 81 adapted to engage upon rod 77 so that finger-grip member 79 is slidable upon rod 77, the inner end of member 79 having a slender inner portion 82. Drilling 81, near the outer end of finger-grip member 79, is of enlarged internal diameter providing a shoulder 83, a thumb-rest member 84 is screw-threadedly engaged upon end portion 78 of rod 77 and a spring 85 interposed between thumb-rest member 84 and shoulder 83 tends to urge finger-grip member 79 in a direction towards valve member 28.

Adjacent one marginal edge of the stationary valve member 27 is secured a curved guide plate 86 (see Figs. 1, 2, 4 and 10) containing a slot 87 in which rod 77 is adapted to move when the handle 76 is rocked from one end to the other of its path of travel. Approximately one half of slot 87 is narrower in width than the other half (see Fig. 2), and a pair of sloping shoulders 88 mark the point where the narrower portion 89 of the slot merges into the wider portion 90 thereof. The width of wider portion 90 of the slot is approximately equal to or a little larger than the diameter of the inner end portion 82 of finger-grip member 79, and the narrower portion 89 of the slot is a little but not much wider than the diameter of rod 77 at the point where it passes through guide plate 86. The result is that when the finger-grip member 79 is in the normal position to which it is urged by spring 85 (as in Fig. 2), handle 76 when rocked upwardly towards the position shown in Fig. 1 will be stopped at that position by engagement of portion 82 with shoulders 88. This, as will be explained below, is the position in which the valve parts are closed except for the venting of steam to atmosphere from the heater. In order to raise the handle from the position shown in Fig. 1 to a vertical position, finger-grip member 79 is manually pulled by the forefingers against the tension of spring 85, aided by pressure of the thumb on member 84, till fingergrip member 79 has been raised to the position shown in Fig. 10. In this position its end portion 82 no longer occupies slot 87, and consequently portion 82 will clear shoulders 88 when the handle is moved upwardly.

Delivery mechanism 22 is so mounted that the five nipples 42, 45, 48, 51 and 54 (see Fig. 1) extend into the interior of casing 23. Suitable flexible piping, for example, rubber or plastic hose, are secured to these nipples in order to interconnect them with other elements within casing 23. Line 91 connects nipple 42 with the cold water inlet of the heater; line 92 connects nipple 45 with a source of cold water under pressure. For convenience it is usually desirable to interpose in this line a manually-adjustable pressure regulating valve 93. Line 94 connects nipple 48 with a vent to atmosphere; line 95 connects nipple 51 with tank 20 for delivery of coffee concentrate; and line 96 connects nipple 54 with the hot water delivery outlet of the hot water heater 21.

The operation of the device is as follows: When it is desired to draw a cup of coffee, handle 76 is manually rocked from the position shown in Figs. 1 and 12 to that shown in Fig. 11, thus moving valve member 28 through approximately 45° about its pivotal axis.

In the position of Fig. 11, ports 43 and 40 are in fluid communication through groove 74, and consequently cold water entering through line 92 and thus reaching port 43 is permitted to pass to port 40 and thence through line 91 to the heater. At the same time ports 52 and 59 are brought into fluid communication through the registry therewith of groove 72, which permits hot water entering through line 96 to pass through ports 52 and 59 through drilling 60 (Fig. 8) and thus to outer spout tube 61 for discharge into a cup; and at the same time ports 49 and 55 are brought into fluid communication by the registry therewith of groove 73, whereby coffee syrup reaching the valve through line 95 is permitted to flow from port 49 to port 55 and thence through drilling 57 (Figs. 8 and 9) to inner spout tube 58 and thence to the cup. Cold water, hot water and coffee syrup will flow in the indicated paths so long as the valve remains in the position indicated in Fig. 11.

When it is desired to terminate the flow of coffee, handle 76 is raised from the position shown in Fig. 11 to that shown in Fig. 12.

In the position of Fig. 12, ports 43 and 40 are not in communication because groove 74 has been moved away from registry therewith; consequently there is no flow of cold water through the valve to the heater. Ports 52 and 59 are not in communication, since groove 72 has been moved to a place where it is not in registry with port 52. Consequently hot water or other fluid from the heater issuing from port 52 cannot flow to the spout. Ports 49 and 55 are likewise not in communication and therefore flow of coffee syrup is prevented. However, ports 52 and 46, at this position, are in communication with each other by reason of the fact that groove 71 is in registry with both of them. Consequently, steam or water vapor produced in the heater upon cessation of water flow therein, and which is unable to escape through line 91, is vented through line 96 to port 52, thence to port 46, and finally to the atmosphere through line 94. By this means the hot water heater, assuming it to be of the flash-boiler type with its oppositely-poled electrodes under a continuously maintained potential, is permitted to boil away residual water without building up undue steam pressure, and thus to interrupt current flow by removal of all liquid conductor between the electrodes.

When it is desired to draw hot water, without coffee or other flavor, the handle 76 is moved to the position in Fig. 13. In order to enable handle 76 to pass the obstruction afforded by shoulders 88, finger-grip member 79 is raised against the resistance of spring 85 so as to clear shoulders 88.

In the position of Fig. 13 ports 40 and 43 are in fluid communication by the registry therewith of groove 75, and consequently cold water flows from the supply thereof through line 92, the ports named, and line 91 to the heater. Also, ports 52 and 59 are in fluid communication by the registry therewith of groove 71 thereby permitting hot water to flow from the heater through line 96, and through the ports stated, to outer discharge spout tube 61. Communication between ports 49 and 55 is interrupted, and consequently coffee syrup does not flow. Port 46 is not in fluid communication with any other port and consequently there is no venting to atmosphere.

The smooth working surface 30 of movable valve member 28 thus serves to close off and seal the several ports in fixed valve member 27, except where such surface is interrupted by one of the grooves. In particular, a narrow neck-like portion 97 (see Fig. 6) of the general surface 30 separates grooves 71 and 72. This neck-like portion 97 at its central and narrowest point, is of less width than the diameter of port 52, across which it is adapted to slide when the handle 76 is moved from the position of Fig. 11 to the position of Fig. 12. Consequently, port 52 is never at any position of the handle completely closed off or sealed. In effect, as the handle is raised toward the position of Fig. 12, venting to atmosphere begins before flow of hot water to the cup is fully terminated. As a result there is no danger of explosion due to inadvertent trapping of water in the heater.

By means of the device above-described there is provided a single valve mechanism which, in effect, interposes two simultaneously actuable valves in the course of water flow, one upstream and one downstream of the heater, and in addition vents the heater to atmosphere when both these valves are closed. The result is that steam generated in the heater when water flow therein has been stopped does not exhaust through the spout, nor build up back pressure against the water supply, but is quickly vented through line 94. Thus the water itself constitutes the bridging element which causes current flow in the heater, and when the water vaporizes away the current flow is interrupted.

The concentric spouts 58 and 61 assure that water and syrup do not mix till they are both falling downwardly under the influence of gravity after discharge from their respective delivery orifices. By this means, if the device is arranged to dispense at will either coffee or hot water (i. e., for making tea), alternate cups of each may be drawn from the same spout without contaminating the hot water with residual coffee flavor from the previous draw.

The invention is not limited to the particular device herein shown to illustrate one embodiment thereof, but embraces all equivalent devices within the scope of the subjoined claims.

What is claimed is:

1. For use in hot beverage dispensing machines, the combination of an electric water heater containing a pair of oppositely-poled electrodes mounted coaxially and spaced to permit the flow between them of water to be heated conductively by current passing between the electrodes, with a valve having a fixed valve member containing a first port connected to the outlet of the water heater, a second port connected to a delivery spout and a third port connected to a vent, and also having a movable valve member controlled by a handle, the movable valve member containing conduits formed therein adapted to transmit water from the first to the second ports when the handle is depressed and from the first to the third ports when the handle is raised, the portion of the surface forming part of said movable valve member which separates said conduits having a width smaller than the width of the first port and being movable across said first port as the handle is moved, whereby fluid issuing from said first port will be diverted to the third port as the handle is raised, and to the second port as the handle is depressed, without complete closure of the first port in any position of the movable valve member.

2. For use in hot beverage dispensing machines, the combination of an electric water heater containing a pair of oppositely-poled electrodes mounted coaxially and spaced to permit the flow between them of water to be heated conductively by current passing between the electrodes, with a valve having a fixed valve member containing a first port connected to a source of water under pressure, a second port connected to the inlet of the water heater, a third port connected to the outlet of the water heater, a fourth port connected to a delivery spout and a fifth port connected to a vent, and also having a movable valve member controlled by a handle, the movable valve member containing a conduit formed therein adapted to transmit water from the first to the second ports when the handle is depressed, a first portion of the surface forming part of said movable valve member closing at least one of said first and second ports when the handle is raised and a second portion of the surface forming part of said movable valve member of less width than the width of the third port and movable across said third port as the handle is moved, whereby fluid issuing from said third port will flow to the fourth port when the handle is depressed, and to the fifth port when the handle is raised, without complete closure of the third port in any position of the valve member.

3. For use in hot beverage dispensing machines, the combination of an electric water heater containing a pair of oppositely-poled electrodes mounted coaxially and spaced to permit the flow between them of water to be heated conductively by current passing between the electrodes, with a valve having a fixed valve member containing a first port connected to a delivery spout, a second port connected to the outlet of the water heater, and a third port connected to a vent, and also having a movable valve member controlled by a handle, the movable valve member containing at least two conduits formed therein and adapted as the handle is moved to pass across the said three ports, a surface forming part of said movable valve member and separating the said conduits, and being adapted when the valve moves to move across said second port, whereby the first and second ports are in fluid communication through one of said conduits in one position of the handle, the second and third ports may be brought into fluid communication through the other of said conduits when the handle has been moved to an intermediate position, and the first and second ports are again brought into fluid communication through said other conduits when the handle has been moved still further in the same direction past intermediate position.

4. A beverage dispenser comprising in combination a source of hot water, a source of flavoring syrup and a valve connected to said sources, said valve comprising a bed plate having a flat surface forming a smooth working face all parts of which lie substantially in the same plane, a movable valve plate having a smooth working face, a headed journal bolt passing through both said plates and adapted to secure their respective working faces in direct and substantially fluid-tight engagement, said bolt constituting a pivot on which the movable valve plate is adapted to rotate relative to the bed plate while the said working faces remain in substantially fluid-tight engagement, an operating lever secured to the movable valve plate for rotation thereof about said pivot, a spout secured to the bed plate for delivery of a stream of hot water from said water source downwardly from a passage in said bed plate, a tube positioned within said spout and substantially coaxial therewith for discharge of flavoring syrup from said syrup source into a stream of water issuing from the spout at the discharge end thereof, and ports and passages in the working faces of said plates whereby, at successive positions of the lever about its arc of rotation, hot water is discharged from the spout while discharge of flavoring syrup from said tube is prevented, no discharge occurs from either spout or tube, and hot water and flavoring syrup are simultaneously discharged respectively from the spout and from the tube.

5. A hot beverage dispenser comprising in combination a hot water heater and a valve connected to said heater, said valve comprising a valve bed plate having a flat surface forming a smooth working face all parts of which lie substantially in the same plane, a movable valve plate having a smooth working surface, a headed journal bolt passing through both said plates and adapted to secure their respective working faces in direct and substantially fluid-tight engagement, said bolt constituting a pivot on which the movable valve plate is adapted to rotate relative to the bed plate while the said working faces remain in substantially fluid-tight engagement, an operating lever secured to the movable valve plate for manipulation thereof about said pivot, a spout secured to the bed plate, said bed plate containing a first port connected to a source of water under pressure, a second port connected to the inlet of the water heater, a third port connected to the outlet of the water heater, a fourth port connected to said aforementioned spout, and a fifth port connected to a vent, said movable valve plate containing a conduit formed therein and intersecting the working face thereof adapted to transmit water from the first to the second ports when the handle is depressed, said valve plate also having a portion of its working face adapted to close said first- and second-mentioned ports when the handle is raised, and a further portion of the working surface of said valve plate extending between two openings in said surface and having a width determined by the distance between the marginal edges of said openings, the width of said portion of the surface being less than the width of the third port in the bed plate and movable across said third port as the handle is moved, whereby fluid issuing from said third port will flow to the fourth port when the handle is raised, and to the fifth port when the handle is depressed, without complete closure of the third port by the valve plate in any position of the latter.

6. A hot beverage dispenser as described in claim 5 wherein the heater contains a pair of oppositely-poled electrodes mounted coaxially and spaced to permit the flow longitudinally therebetween of water to be heated conductively by current passing between said electrodes.

7. A beverage dispenser comprising in combination a source of hot water, a source of flavoring syrup and a valve connected to said source, said valve comprising a bed plate having a flat surface forming a smooth working face all parts of which lie substantially in the same plane, a movable valve plate having a smooth working face, said movable valve plate being adapted to rotate relative to said bed plate while the said working faces remain in substantially fluid-tight engagement, an operating lever secured to the movable valve plate for rotation thereof, a spout secured to the bed plate for delivery of a stream of hot water from said water source downwardly from a passage in said bed plate, a tube positioned within said spout and substantially coaxial therewith for discharge of flavoring syrup from said syrup source into a stream of water issuing from the spout, and ports and passages in the working faces of said plates whereby, at successive positions of the lever about its arc of rotation, hot water is discharged from the spout while discharge of flavoring syrup from said tube is prevented, no discharge occurs from either spout or tube, and hot water and flavoring syrup are simultaneously discharged respectively from the spout and from the tube.

8. A hot beverage dispenser comprising in combination a hot water heater and a valve connected to said heater, said valve comprising a bed plate having a flat surface forming a smooth working face, a movable valve plate having a smooth working surface, said movable valve plate being adapted to rotate relative to said bed plate while said working faces remain in substantially fluid-tight engagement, an operating lever secured to the movable valve plate for rotation thereof, a spout secured to the bed plate, said bed plate containing a first port connected to a source of water under pressure, a second port connected to the inlet of the water heater, a third port connected to the outlet of the water heater, a fourth port connected to said aforementioned spout, and a fifth port connected to a vent, said movable valve plate containing conduits formed therein and intersecting the working face thereof adapted to transmit water from the first to the second port and from the third to the fourth port when the handle is in one position and from the third port to the fifth port when the handle is in another position.

References Cited in the file of this patent

UNITED STATES PATENTS

| | | |
|---|---|---|
| 667,891 | Neudecker | Feb. 12, 1901 |
| 1,474,638 | Martin | Nov. 20, 1923 |
| 1,969,462 | Hodgkins | Aug. 7, 1934 |
| 2,401,914 | Di Pietro | June 11, 1946 |
| 2,681,974 | Wilson | June 22, 1954 |